United States Patent [19]
Zingarelli et al.

[11] Patent Number: 5,596,203
[45] Date of Patent: Jan. 21, 1997

[54] SYSTEM AND METHOD FOR DETECTING THE RELATIVE POSITION AND MOTIONS BETWEEN A RAIL VEHICLE AND TRACK

[75] Inventors: Angelo Zingarelli, Chieri; Cesare Santanera, Turin, both of Italy

[73] Assignee: Fiat Ferroviaria S.p.A., Turin, Italy

[21] Appl. No.: 425,807

[22] Filed: Apr. 20, 1995

[30] Foreign Application Priority Data

Oct. 13, 1994 [IT] Italy .................. T094A000817

[51] Int. Cl.⁶ .............. G01N 21/86; G01V 8/00
[52] U.S. Cl. ............ 250/559.29; 250/559.38; 356/4.01; 73/105; 33/1 Q; 33/287; 33/338
[58] Field of Search .......... 250/559.29, 559.38; 33/1 Q, 287, 338, 523.1, 651, 651.1; 356/4.01, 3.01, 3.06; 73/105, 104

[56] References Cited

U.S. PATENT DOCUMENTS

| | | | |
|---|---|---|---|
| 3,828,440 | 8/1974 | Plasser et al. | 33/144 |
| 4,069,590 | 1/1978 | Effinger | 33/174 L |
| 4,625,412 | 12/1986 | Bradshaw | 33/1 Q |
| 4,691,565 | 9/1987 | Theurer | 73/146 |
| 5,199,176 | 4/1993 | Theurer et al. | 33/338 |
| 5,353,512 | 10/1994 | Theurer et al. | 33/523.2 |

*Primary Examiner*—Edward P. Westin
*Assistant Examiner*—Stephen Calogero
*Attorney, Agent, or Firm*—Sughrue, Mion, Zinn, Macpeak & Seas

[57] ABSTRACT

A detecting system for rail vehicles having at least one sprung rigid structure, for instance a bogie frame, and two axles, comprises photosensor position-detecting means applied to the structure and adapted to detect typical geometrical characteristics of the track and the relative position between the axles and the rails when the vehicle is running along the track and to supply electrical signals which are indicative of such geometrical characteristics and such relative position, and displacement detecting means also applied to the structure and adapted to detect relative displacements between the structure and the axles and to supply electrical signals indicative of these displacements. Electronic acquisition and processing means of these electrical signals provide a monitoring related to the configuration of the track and to the dynamic attitude of the structure and of the two axles.

10 Claims, 2 Drawing Sheets

SYSTEM AND METHOD FOR DETECTING THE RELATIVE POSITION AND MOTIONS BETWEEN A RAIL VEHICLE AND TRACK

BACKGROUND OF THE INVENTION

The present invention is related in general to rail vehicles having axles and masses which are sprung and movable relative to these axles. More particularly, the invention is directed to a system for detecting the relative position of said sprung masses relative to the track and relative to the single axles in view of obtaining, through processing of the detected data, information about the relative motions of each of these bodies (sprung mass/axles) both mutually and with respect to the track, on the basis of the dynamic interactions which are exchanged between these bodies.

In the field of railway vehicles it is known to provide the bogies thereof with optical detecting equipments, also with the aid of laser transducers, to the aim of inspecting and monitoring the railway line, for instance in terms of geometry, alignment and spacing of the rails. Examples representing these applications are disclosed and illustrated in French Patent Application FR-A-2.674.809 and in European Patent Application EP-A-0293015.

Other applications of optical detecting equipments on railway vehicles contemplate monitoring the contour profile of the wheels by means of optical laser transducers, such as in the case of British Patent Application GB-A-2,178.169.

SUMMARY OF THE INVENTION

The object of the present invention is to provide a detecting system and method for railway vehicles by means of which data can be obtained for the evaluation of the friction work between the wheels and rails for wear forecasting, as well as for checking the running attitude of the axles and of the mass sprung thereover, and locating relative amplitude and phases of the dynamic phenomena of these members, so as to allow corrective means to be introduced.

The system and method according to the invention are particularly directed to the achievement, in extremely short times, of testing and setup evaluations of railway bogies by the manufacturers, to the aim of ascertaining the consequences of any constructive irregularities and determining the locations at which it may be possibly necessary to introduce damping devices or different corrective means so as to improve the dynamic behaviour of the railway vehicle, and in particular to prevent any dynamic instability thereof.

According to the invention, the above object is achieved by virtue of a detecting system for railway vehicles having at least two axles and a mass (hereinafter designated as "structure") which is sprung over and movable relative to said axles, essentially characterized in that it comprises:

photosensor position-detecting means applied to the structure and adapted to detect typical geometrical characteristics of the track and the relative position between said structure and the rails in the running condition of the vehicle along the track, and to provide electrical signals indicative of said geometrical characteristics and said relative position, displacement detecting means also applied to said structure and adapted to detect the relative displacements between said structure and each of said axles, and to provide electrical signals indicative of said displacements, electronic acquisition and processing means of said electrical signals, adapted to provide a monitoring related to the track configuration and to the dynamic attitude of said structure.

According to a preferred embodiment of the invention, said position detecting means comprise two pairs of laser transducers applied on the opposite sides of respective transverse sections of the structure and oriented towards the inner flanks of the track rails, and a further laser transducer applied on one side of an intermediate transverse section of the structure and oriented towards the inner flank of the corresponding rail adjacent thereto of the track.

The displacement detecting means, which characterize the relative position between each axle subjected to measurement and the sprung mass or structure, conveniently comprise two pairs of vertical displacement transducers, two pairs of longitudinal displacement transducers, and two lateral displacement transducers, operatively associated to supports fixedly connected to non-rotating parts of the two axles.

The vertical, longitudinal and lateral displacement transducers may preferably, but not necessarily, be of a mechanical-linear type, for instance of the differential transformer type.

The processing means are to advantage adapted to provide the following data:

in connection with the track configuration: rail gauge in correspondence of each transverse section, average curvature (conveniently detected by three laser transducers oriented towards the same rail) and track skew on the basis of the wheel base between the axles;

in connection with the dynamic attitude of the structure and of the single axles: lateral displacements between the structure and the track, hunting, rolling, pitching, shaking, relative displacement between each axle and track, angle of attack between each axle and track.

The method according to the invention, which employs the system such as set forth in the above, is mainly characterized in that it consists of the following steps:

detecting typical geometrical characteristics of the track and the relative position between the axles and rails in the running condition of the vehicle along the track, by means of photosensor position-detecting means applied to the structure and oriented towards the inner flanks of the track rails, obtaining from said detecting step electrical signals indicative of said geometrical characteristics and said relative position, detecting the relative displacements between the structure and the axles in the running condition of the vehicle along the track, by means of displacement detecting means operatively associated to supports fixedly connected to the non rotating parts of each of said two axles, obtaining from said detecting step electrical signals indicative of such displacements, processing said electrical signals so as to provide a monitoring in connection with the configuration of the track and the dynamic attitude of the structure and of the two axles.

BRIEF DESCRIPTION OF THE DRAWINGS

The invention will now be disclosed in detail with reference to the accompanying drawings, purely provided by way of non-limiting example, in which.

DETAILED DESCRIPTION OF THE INVENTION

Figure 1:
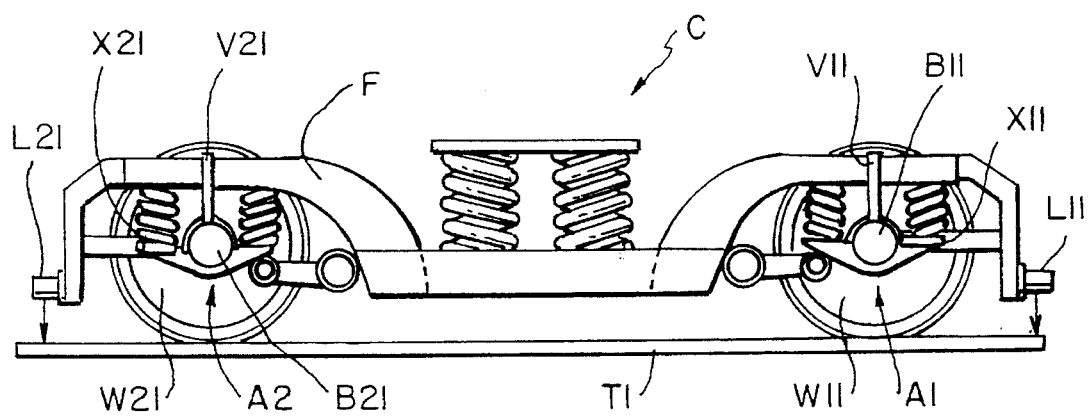
FIG. 1 is a diagrammatic side elevational and partially sectioned view of a two-axle bogie for railway vehicle equipped with a detecting system according to the invention.
Figure 2:
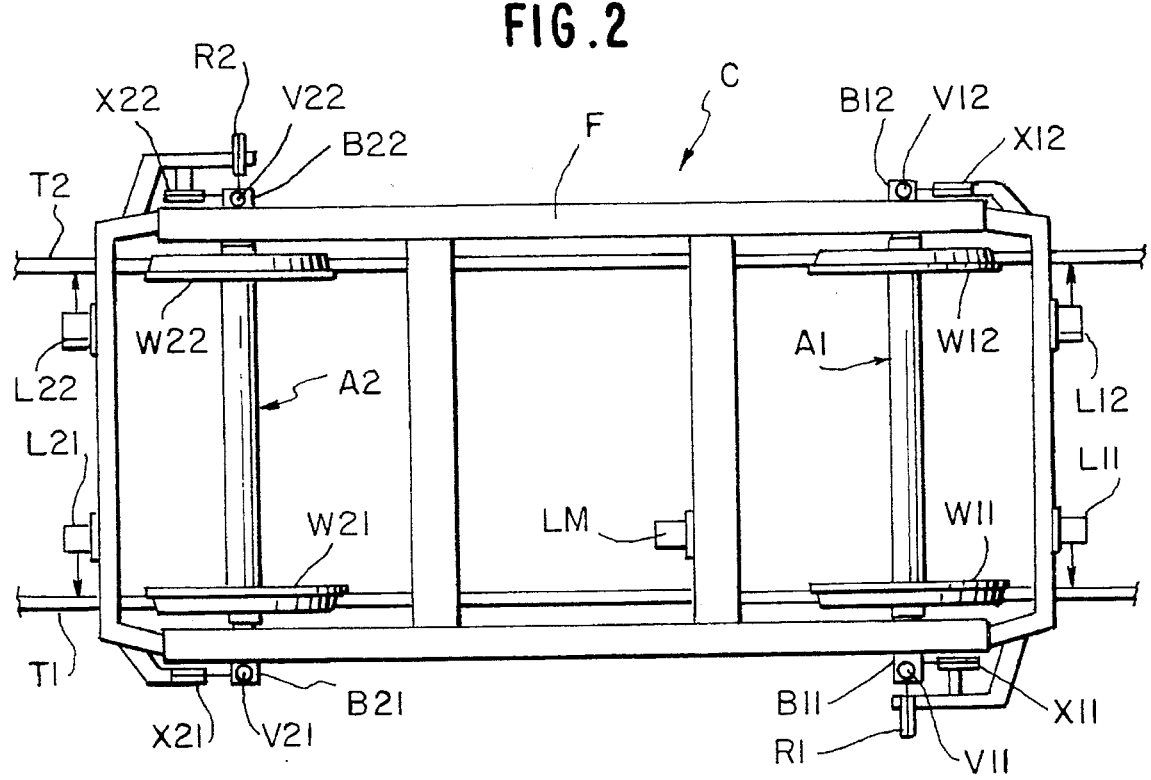
FIG. 2 is a top plan view of FIG. 1.

Referring initially to FIGS. 1 and 2, reference C generally designates in its entirety a two-axle bogie intended to be employed in a railway vehicle (not shown), comprising traditionally a body and a second bogie quite identical to the bogie C.

Briefly, this bogie C comprises a frame structure F and a pair of axles A1, A2 having respective wheels W11, W12 and W21, W22 arranged in proximity of the ends (front end and rear end, respectively) of the frame F. The opposite ends of each axle A1, A2 are connected to the opposite sides of the frame F, also in a conventional way, by means of respective journal boxes B11, B12 and B21, B22.

A primary spring suspension system, diagrammatically depicted in FIG. 1, is conventionally interposed between the axles A1, A2 and the frame F.

According to the invention, the bogie C is equipped with a detecting system employing a series of transducers, the location of which is diagrammatically depicted in FIGS. 1 and 2, connected through conventional acquisition systems of the respective output signals normally of the digitizing board type, to a programmable micro-processor electronic unit (not shown in the drawings).

These transducers, by means of which as it will be apparent in the following the dynamic phenomena of the bogie when running along the rails T1, T2 are monitorized, comprise two groups: a first group including position transducers, adapted to detect typical geometrical characteristics of the track and the relative position between the axles A1, A2 and the respective rails T1, T2 in the running condition of the vehicle and to provide corresponding electrical signals indicative of the detected entities, and a second group including displacement transducers, adapted to detect the relative displacements between the frame F of the bogie C and the axles A1, A2, and to provide electrical signals indicative of the detected entities.

In better detail, the position transducer group comprises:

a first pair of photosensors, preferably of the laser type, indicated as L11 and L12, applied on opposite sides in correspondence of the front end of the frame F, in front of the axles A1, and oriented towards the inner flanks of the rails T1 and T2, respectively;

a second pair of photosensors, also preferably of the laser type, designated as L21 and L22 and applied on opposite sides in correspondence of the rear end of the frame F, behind the axle A2, and also oriented towards the inner flanks of the rails T1, T2 respectively;

a further photosensor, also normally of the laser type, indicated as LM and applied on one side of an intermediate area of the frame F and oriented towards the inner flank of the corresponding rail T1. As it can be clearly seen in FIG. 2, the position of the photosensor LM may conveniently be offset with respect to the transverse center line of the bogie C, whereby its distance from the front axle A1 is different, and in the case of the shown example less, than its distance with respect to the rear axle A2.

As explained in the above, the photosensors L11, L12, L21, L22, LM are conveniently (but not necessarily) of the laser emitter type, for instance having a detecting range of 325±40 mm, a 12 bit resolution, a detecting frequency of 6 kHz and a passband selectable between 10 Hz and 2 kHz. This type of photosensor is operating, in a way known per se, according to the generation of two electronic currents which are proportional to the position of an infrared spot focused onto the surface thereof. The object to be detected (in the instant case the inner flank of the rail) reflects in all directions the light energy projected onto its surface by the emitter: a portion of this reflected energy is focused on the receiver, through which electrical signals indicative of the position of the rail inner flank relative to the emitter are generated. These electrical signals supplied by the receiver are treated via a signal conditioner, normally including in a way known per sea a linearization circuit with low-pass analogical filter. The conditioned signals are then fed to an acquisition board for digitizing and transmission thereof to the electronic processing unit.

The group of displacement sensors comprises a series of mechanical transducers, for instance of the linear variable differential transformer LVDT, the function of which is to detect the relative displacements between the frame F of the bogie C and the axles A1, A2, and to supply electrical signals indicative of these displacements. More particularly, the group of the displacement sensors comprises:

two pairs of longitudinal displacement transducers X11, X12 and X21, X22 for detecting displacements in the longitudinal direction of the journal boxes B11, B12 of the axle A1, and of the journal boxes B21, B22 of the axle A2, respectively, relative to the frame F of the bogie C;

two pairs of vertical displacement transducers V11, V12 and V21, V22 for detecting the vertical displacements of the journal boxes B11 and B12 of the axle A1 and of the journal boxes B21 and B22 of the axle A2, respectively, relative to the frame F of the bogie C, two lateral displacement transducers R1, R2 frontally facing the journal box B11 and the journal box B22, respectively, for detecting displacement in the transverse direction of the axles A1 and A2, respectively, relative to the frame F of the bogie C.

Also the displacement transducers X11, X12, X21, X22; V11, V12, V21, V22; R1, R2 are connected to the electronic processing unit via digitizing boards.

The electronic processing unit may consists for instance of a 386 and/or 486 personal computer with associated peripheral units.

The detecting system is further operatively connected to an odometer device of a conventional type (indicated as ODO in the flow chart of FIG. 3) for the measurement of distance and speed during running of the vehicle, to the aim of obtaining spatial references for the measurements performed and processed by the system.

Figure 3:
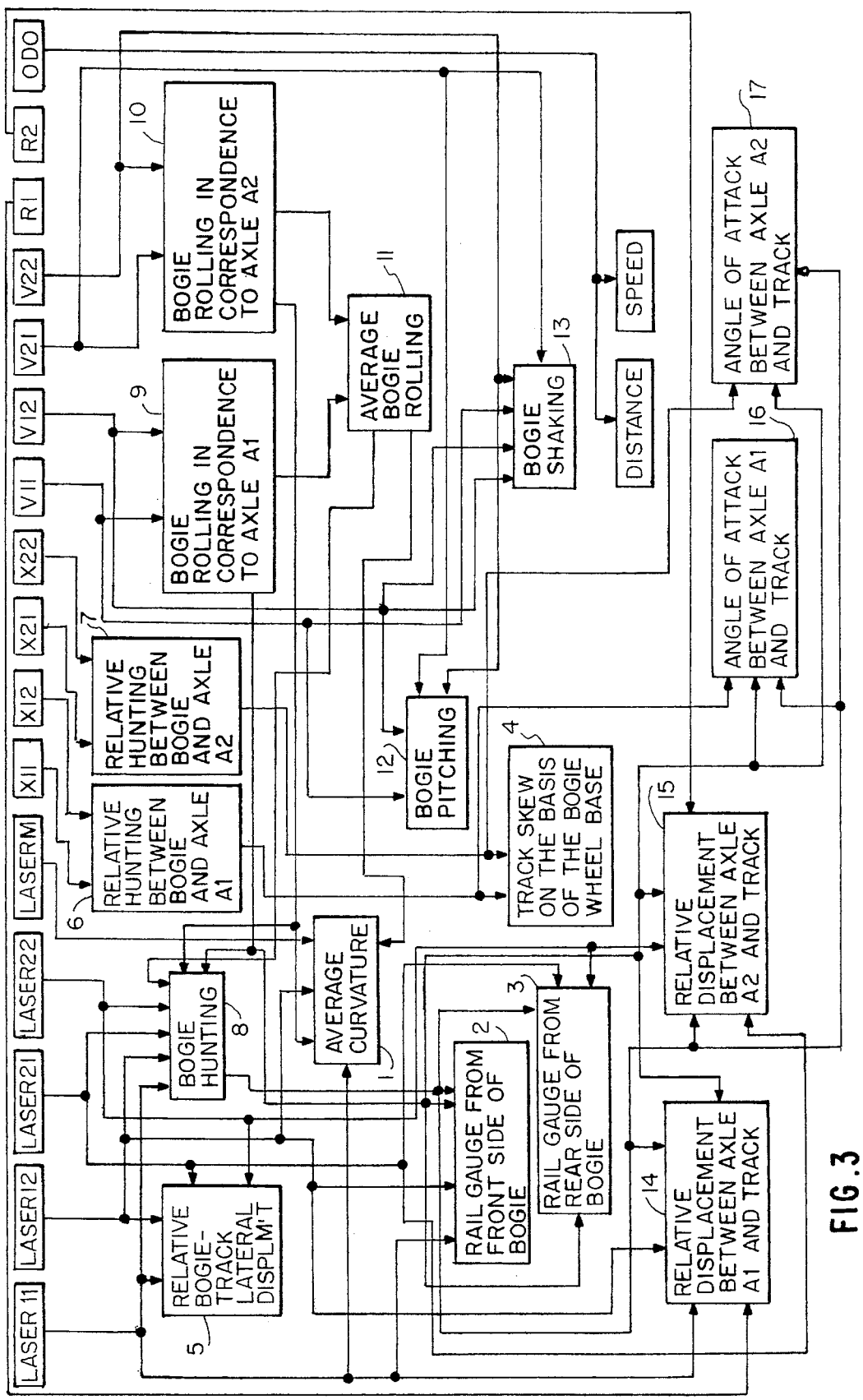
FIG. 3 is a flow chart showing the processing logic of the signals generated in the detecting system according to the invention.

FIG. 3 diagrammatically shows the processing flow chart of the signals generated by the two groups of position and displacement transducers, respectively, previously disclosed. Through suitable mathematical algorithms which shall be briefly disclosed herebelow, and in an approximation hypothesis according to which the rails T1 and T2 are considered as "ideal" (i.e. having a vertical or constantly slanting inner flank), a series of data is calculated, indicative both of typical geometrical characteristics of the track, and of the relative position between the axles and the track in the running condition of the bogie C.

More in detail, according to the chart of FIG. 3 and with reference to the blocks indicated therein by respective numerals, the data related to the track characteristics are the following: average curvature (1), rail gauge in two sections corresponding to the front side and to the rear side of the bogie (2, 3), track skew on the basis of the bogie wheel base (4).

The data obtained in connection with the dynamic behaviour of the bogie are as follows: relative bogie-track lateral displacement (5), relative hunting between the bogie and each axle (6, 7), bogie hunting (8), bogie rolling in correspondence of each axle (9, 10), average bogie rolling (11), bogie pitching (12), bogie shaking (13), relative displacement between each axle and track (14, 15), angle of attack between each axle and track (16, 17).

For the calculation of the final magnitudes defining the position of the bogie relative to the track, it is necessary to process the signals supplied by the transducers, to obtain therefrom certain intermediate values, and to perform a few suitable combinations between the signals themselves. The most relevant intermediate magnitude is the relative displacement in the horizontal transverse direction of the rails with respect to the structure in correspondence of each laser transducer: this magnitude shall be indicated hereinafter as "corrected laser".

The calculation of the corrected laser values is carried out by means of a trigonometric relationship which takes into account the angles of inclination of the laser transducers, which result from the sum of the fixed mounting angles of the transducers and the angles generated by the movements of the structure. These angles can be deduced as a function of the signals of the mechanical transducers and the mounting positions thereof.

The curvature of the rail towards which the laser transducers L11, LM and L21 are oriented is calculated through a linear combination relationship among the signals of these three corrected laser transducers so as to determine the longitudinal misalignment between the detecting points of the laser transducers themselves. From the value of this misalignment and the mutual distances between the laser transducers, the curvature and thus the curve radius can be obtained.

The rail gauge detected in the two transverse sections corresponding to the laser transducers L11–L21, and L21–L22, corresponds to the difference between the corrected laser signals, and represents the variation of the rail gauge with respect to the nominal value.

The relative axle-track displacement is calculated by means of the difference between the lateral displacement of the center of the axle and the displacement of the center of the rail. The former is calculated through a linear combination of the movements of the structure and of the relative displacement between axle and structure. The latter is calculated as the arithmetical mean between the corrected laser L11–L12, L21–L22 signals of the first and second axle, respectively.

The angle of attack is evaluated as algebrical sum of the relative angle between each axle and the structure, calculated through a linear combination of the signals supplied by the longitudinal transducers, of the angle between the structure and track, calculated as a linear combination of the corrected laser signals supplied by the four end laser transducers, and of the geometrical angle due to the track curvature in correspondence of the first and second axle.

In practice, the data thus obtained enable globally evaluating and monitoring the dynamic behaviour of the bogie in terms of attitude, centering, relative amplitudes and phases of the motions of the various components, as well as to determine consequently the friction work between the wheels and rails for wear forecasting. In summary, the system of the invention allows testing and setup of the bogie, i.e. of the vehicle equipped with the bogie itself, to be carried out quickly and with reliable and accurate results.

Naturally the details of construction and the embodiments may be widely varied with respect to what has been disclosed and illustrated, without thereby departing from the scope of the present invention such as defined in the appended claims.

What is claimed is:

1. A detecting system for a railway vehicle running along a track formed by two parallel rails, said railway vehicle having at least two axles and a structure which is sprung over and movable relative to said axles, comprising:

photosensor position-detecting means applied to said structure and adapted to detect geometrical characteristics of the track and the relative position between said structure and said rails and to provide electrical signals indicative of said geometrical characteristics and said relative position, displacement detecting means also applied to said structure for detectinq relative displacements between said structure and each of said axles, and to provide electrical signals indicative of said displacements, electronic acquisition and processing means for acquiring and processing said electrical signals, to monitor track configuration and dynamic attitude of said structure relative to said axles.

2. Detecting system according to claim 1, wherein said rails of the track have respective inner flanks and said structure has transverse sections with opposite sides, and wherein said position detecting means comprise two pairs of laser transducers applied on said opposite sides of two respective end transverse sections and oriented towards said inner flanks of the track rails, and a further laser transducer applied on one side of an intermediate transverse section of the structure and oriented towards the inner flank of the corresponding rail adjacent thereto.

3. Detecting system according to claim 1, wherein each of said axles comprises non-rotating members and support means fixedly connected to said non-rotating members, and wherein said displacement detecting means comprise, for each axle, a pair of vertical displacement transducers, a pair of longitudinal displacement transducers, and one lateral displacement transducer operatively applied to said support means.

4. Detecting system according to claim 3, wherein said vertical, longitudinal and lateral displacement transducers comprise linear variable differential transformers.

5. Detecting system according to claim 3, wherein said processing means are adapted to provide the following data:

in connection with the track configuration: rail gauge in correspondence of each transverse track section, average curvature and track skew on the basis of the wheel base between the axles;

in connection with the dynamic attitude of said structure and said axles: structure-track lateral displacements, hunting, rolling, pitching, shaking, relative displacement between each axle and track, angle of attack between each axle and track.

6. Detecting system according to claim 1, wherein said structure is a railway bogie frame.

7. A detecting system for a railway vehicle running along a track formed by two parallel rails having respective inner flanks, said railway vehicle having at least two axles each comprising non-rotating members and support means fixedly connected to said non-rotating members, and a mass or structure which is sprung over and movable relative to said axles, consisting of the following steps:

provㅇiding photosensor position-detecting means applied to said structure and oriented towards said inner flanks of said track rails;

providing displacement detecting means operatively connected to said support means;

detecting geometrical characteristics of said track and the relative position between said axles and rails by means of said photosensor position-detecting means, so as to obtain electrical signals indicative of said geometrical characteristics and said relative position, detecting the relative displacements between said structure and said axles by means of said displacement detecting means, so as to obtain electrical signals indicating of said displacements, processing said electrical signals, and monitoring track configuration and dynamic attitude of said structure and said two axles.

8. Method according to claim 7, wherein said structure has transverse sections with opposite sides and wherein two pairs of laser transducers are employed as said position detecting means, said laser transducers being applied on opposite sides of respective end transverse sections and oriented towards said inner flanks of said track rails, and a further laser transducer is applied on one side of an intermediate transverse section and is oriented towards the inner flank of the corresponding rail.

9. Method according to claim 8, wherein said structure is a railway bogie frame and said support means of said axles comprise journal box means, and wherein two pairs of vertical displacement transducers, two pairs of longitudinal displacement transducers and two lateral displacement transducers are employed as said displacement detecting means and are operatively applied to said journal box means.

10. Method according to claim 7, wherein said processing means provide the following data:

in connection with the track configuration: rail gauge in correspondence of each track transverse section, average curvature and track skew on the basis of the wheel base between said axles;

in connection with the dynamic attitude of said structure and said axles: structure-track lateral displacements, hunting, rolling, pitching, shaking, relative displacement between each axle and track, angle of attack between each axle and track.

* * * * *